United States Patent [19]

Hashimoto

[11] Patent Number: 4,480,266

[45] Date of Patent: Oct. 30, 1984

[54] METHOD AND APPARATUS FOR PREVENTING GENERATION OF FALSE COLOR SIGNALS IN COLOR TELEVISION CAMERAS

[75] Inventor: Takaaki Hashimoto, Noda, Japan

[73] Assignee: Nippon Kogaku K.K., Tokyo, Japan

[21] Appl. No.: 390,900

[22] Filed: Jun. 22, 1982

[30] Foreign Application Priority Data

Jun. 24, 1981 [JP] Japan .................................. 56-96739

[51] Int. Cl.³ .............................................. H04N 9/07
[52] U.S. Cl. ................................................... 358/43
[58] Field of Search ........................ 358/43, 44, 41, 50

[56] References Cited

U.S. PATENT DOCUMENTS 4,104,679 8/1978 Kitamura et al. ...................... 358/44

Primary Examiner—Richard Murray
Attorney, Agent, or Firm—Michael N. Meller

[57] ABSTRACT

In a color television camera of the type in which the red and blue color component signals modulated spatially by color filters and generated from a pick up tube are demodulated by the technique of phase separation through the utilization of correlation in successive scanning lines, a method and apparatus are disclosed which prevent the occurrence of false color signals within the camera by suppressing color errors which occur at the vertical edge portions in the reproduced image on a picture screen of a color television reproducing apparatus. The gain of a color error detecting difference signal indicative of the positions of the vertical edge portions is adjusted by either one or both of red and blue color difference signals, to selectively vary the amount of suppression of the color signals in accordance with the hues. The prevention of a decrease in the color saturation, and the prevention of a green or magenta color error, are effected at the contours of yellowish colors at the boundaries of black and white areas in an image having a high contrast.

14 Claims, 6 Drawing Figures

METHOD AND APPARATUS FOR PREVENTING GENERATION OF FALSE COLOR SIGNALS IN COLOR TELEVISION CAMERAS

BACKGROUND OF THE INVENTION

This invention relates to a method and apparatus for preventing the generation of false color signals in a single-tube or two-tube type color television camera of the type in which at least two color component signals modulated spatially by striped color filters are demodulated by the technique of phase separation, through the utilization of correlation (vertical correlation) in successive lines of scan. More particularly, the invention relates to a method and apparatus for preventing the generation of false color signals in a camera so as to suppress color errors produced at the vertical edge portions of a reproduced image on a picture screen of a color television reproducing apparatus.

With a known color television camera designed so that the modulated color signals produced by spatially modulating at least two color components by striped color filters are demodulated by utilizing vertical correlation on the image, in view of the occurrence of color errors at the vertical edge portions of a reproduced image inherent to the system, it has been the practice such that the difference between a luminance signal and a signal produced by delaying the luminance signal one horizontal scan period is detected to produce a difference signal or a color error detection signal representing the positions of the vertical edge portions, and the gain of a color signal demodulation circuit is controlled by the difference signal, thereby correcting the color errors. FIG. 1 of the accompanying drawings is a block diagram of this type of known color television camera, showing a pick up tube 1 with striped filters, a preamplifier 2, a low-pass filter 3 for removing the modulated component due to the striped filters, to produce a luminance signal Y, a band-pass filter 4, a color signal demodulation circuit 5 for producing the color component signals or red component signal R and blue component signal B from the output of the band-pass filter 4, a delay circuit 6 for providing a delay of one horizontal scanning period, a $\pi/2$-radian phase shifter 7, a gain control circuit 8 for adjusting the amplitude of the output from the delay circuit 6 by the difference signal A, an adder 9 for producing the signal R, a subtractor 10 for producing the signal B, an encoder 11 for producing an NTSC standard signal from the luminance signal Y and the color component signals R and B, another delay circuit 12 for generating a signal produced by delaying the luminance signal Y by one horizontal scanning period, and a subtractor 13 for producing the difference between the signal from the delay circuit 12 and the luminance signal Y to generate the difference signal A.

In a color television camera of the type shown in FIG. 1, the vertical signal waveforms corresponding for example to a black and white pattern image comprising upper and lower black areas and a middle white area become as shown in FIG. 2. More specifically, FIG. 2 (a) shows the luminance signal Y, (b) the average of the signal R and (c) the average of the signal B. As shown in (d), a green component G appears in the white area of the vertical edge portion where the image pattern changes from black to white and a magenta component (R+B) appears in the black area of the vertical edge portion where the image pattern changes from white to black. Particularly, in the case of an image of a televised black and white object having a high contrast, these color errors are caused by the fact that the correction through the gain control of the color signal demodulation circuit by the difference signal A cannot satisfactorily follow or respond to the dynamic range of the object.

While the problem of incomplete correction of color errors in the above-mentioned prior art methods can be solved by, for example, a method proposed in U.S. Pat. No. 4,104,679 in which only when there is no vertical correlation in an image the color signals are prevented by the difference signal A and the image is made monochrome, this method, however, cannot always be considered expedient since all the colors are cancelled at the vertical edge portions of an image and the image is made extremely unnatural in the case of a reddish object such as the face of a man.

SUMMARY OF THE INVENTION

It is a primary object of the invention to provide a false color signal preventing method and apparatus for color television cameras in which the amount of suppression of color signals at the vertical edge portions of an image is controlled in accordance with the hues in the image, thereby preventing deterioration of the picture quality due to excessive suppression of the color signals and making the picture natural.

It is another object of the invention to overcome the deficiencies in the color error correction of the prior art methods by means of a simple circuit construction.

In accordance with one form of the invention, in a color television camera of the single-tube or two-tube image pickup type in which at least two color components of an image of an object are spatially modulated by striped filters and the resulting modulated color signals are demodulated by utilizing vertical correlation in the image thereby generating color signals, in order to correct the color errors at the vertical edge portions of the reproduced image, a difference signal is produced from an unmodulated signal such as a luminance signal containing no modulated component due to the striped filters or a luminance signal used to produce color difference signals, and a signal produced by delaying the unmodulated signal by one horizontal scanning period, and the color signals are suppressed in accordance with a control signal computed on the basis of the difference signal and the color difference signal or signals.

In the false color signal preventing method and apparatus according to the invention, a difference signal A obtained from an unmodulated signal such as a luminance signal Y or a luminance signal $Y_L$ used for producing a color difference signal, and a signal produced by delaying the unmodulated signal by one horizontal scanning period as mentioned previously or a color error correction signal representing the positions of the vertical edge portions, is subjected to a computational operation such as subtraction or division by means of either one or both of color difference signals $R-Y_L$ and $B-Y_L$. Thus, the value of the difference signal A is reduced to a desired value by the reddish or bluish color, thereby selectively subjecting the amount of suppression of the color signals to a variable control in accordance with the hues in the image. In this way, it is possible to prevent a decrease in the color saturation and the green or magenta color errors at the contours of the yellowish colors, at the black and white boundaries of the reproduced image of object having a high contrast and tending to cause color errors at the vertical edge portions of the image.

The above and other objects, features and advantages of this invention will become readily apparent from the following description taken in conjunction with the accompanying drawings.

DESCRIPTION OF THE PREFERRED EMBODIMENTS

Figure 1:
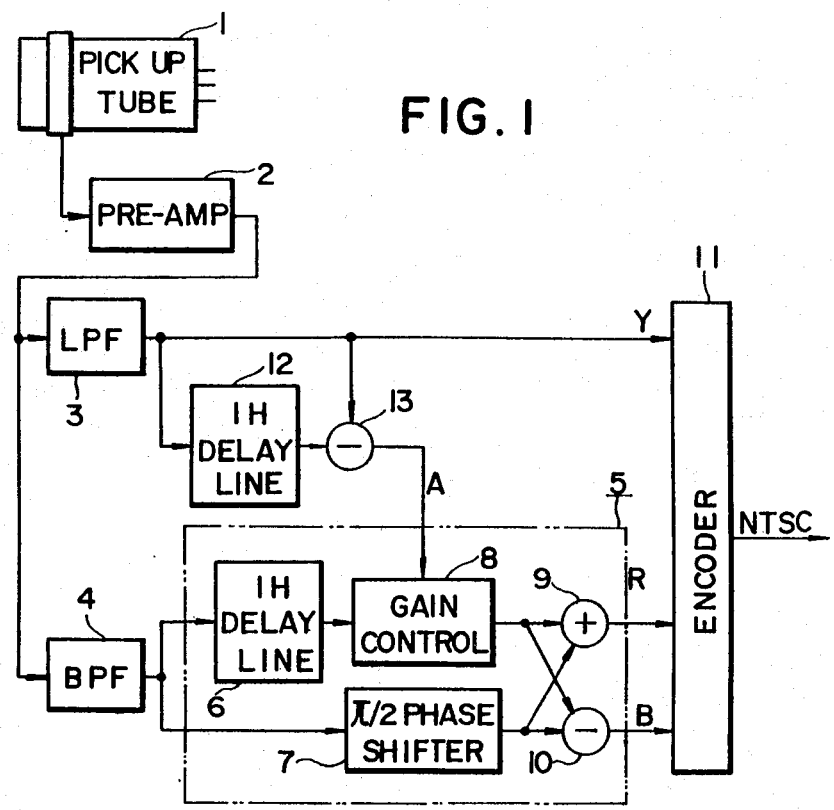
FIG. 1 is a block diagram showing an example of a color television camera according to a prior art false color signal preventing method.
Figure 2:
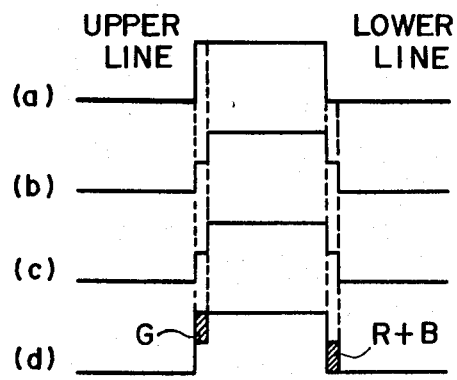
FIG. 2 is a signal waveform diagram for explaining the color errors which occur in the color television camera of FIG. 1.
Figure 3:
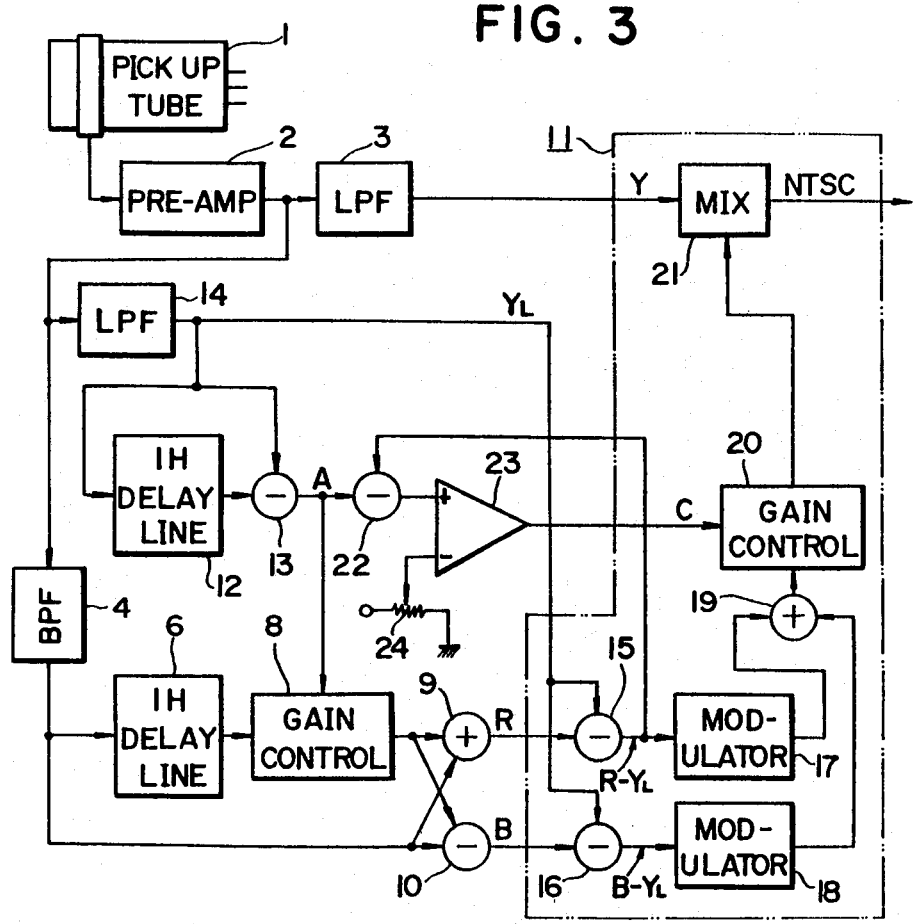
FIG. 3 is a block diagram showing by way of example the construction of a color television camera embodying a false color signal preventing method according to the invention.

In FIG. 3 illustrating a block diagram of a color television camera according to an embodiment of the method of this invention, the same reference numerals as used in FIG. 1 designate the equivalent parts and therefore they will not be explained. A low-pass filter 14 suited to the passbands of the red component signal R and the blue component signal B is adapted to produce a luminance signal $Y_L$ which is used for producing color difference signals, and in the embodiment of FIG. 3 the difference signal A applied to the gain control circuit 8 of the color signal demodulation circuit is produced from the luminance signal $Y_L$ generated from the filter 14. A substractor 15 is arranged for producing a color difference signal $R-Y_L$ from the color difference signal producing luminance signal $Y_L$ and the color component signal R, a subtractor 16 is arranged for similarly producing a color difference signal $B-Y_L$ from the luminance signal $Y_L$ and the color component signal B, balanced modulator circuits 17 and 18 are provided, an adder 19 is provided for combining the outputs of the balanced modulator circuits to produce chrominance signals or color signals, another gain control circuit 20 is arranged for controlling the gain of the color signals in response to a suppression control signal C which will be described later, and a mixer 21 is arranged for combining the gain-controlled color signals and the luminance signal Y to produce an NTSC standard signal.

The difference signal A or the output of the subtractor 13 is applied to the gain control circuit 8 and to another subtractor 22 which in turn performs the operation of subtraction with the color difference signal $R-Y_L$ and whose output $A-R+Y_L$ is applied to one input of a level discriminator 23. The other input of the level discriminator 23 receives a reference potential adjusted by a setting adjuster 24 so that only the input $A-R+Y_L$ exceeding the level set as desired by the adjuster 24 appears at the output of the level discriminator 23. The signal generated at the output of the level discriminator 23 is the previously mentioned suppression control signal C and it is applied to the gain control circuit 20 which in turn is controlled so as to provide a suppression corresponding to the amplitude of the control signal C. For example, if, in the embodiment of FIG. 3, the signal $Y_L$ is large and the signal R is small, the A signal component of the control signal C ($A-R+Y_L$) increases. Thus, if the gain control circuit 20 is controlled by this control signal C, the amount of color signal suppression in the gain control circuit 20 increases and consequently the control is effected such that the amount of chroma (the amount of color) is suppressed more as the signal $Y_L$ increases and the signal R decreases. In other words, the colors at the vertical edge portions are not cancelled in the case of the reddish colors and the other colors at the vertical edge portions are cancelled when the signal $Y_L$ is large.

Figure 4:
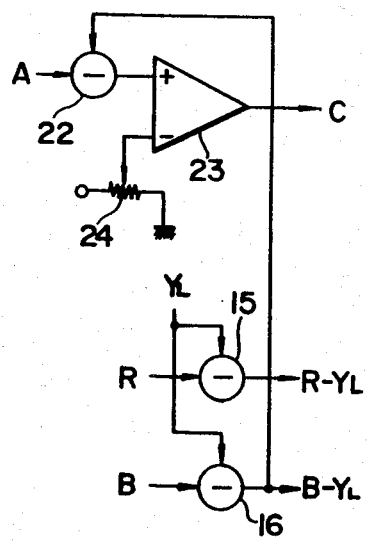
FIG. 4 is a partial block diagram showing a modification of the embodiment shown in FIG. 3.
Figure 5:
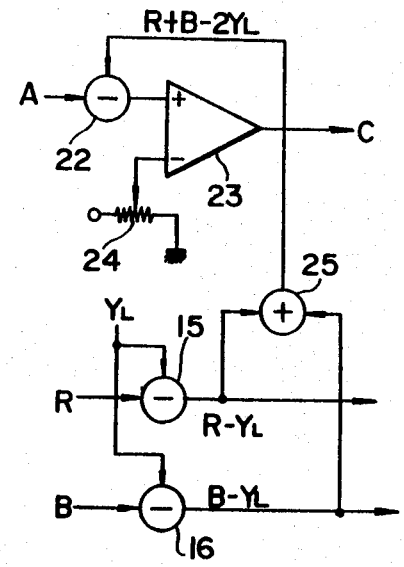
FIG. 5 is a partial block diagram showing another modification of the embodiment.
Figure 6:
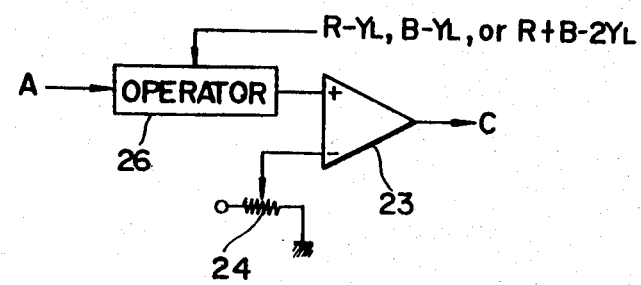
FIG. 6 is a partial block diagram showing still another modification of the embodiment.

While, in the foregoing description, the control signal C is produced by using the color difference signal $R-Y_L$, it is of course possible to use the other color difference signal $B-Y_L$ in place of the signal $R-Y_L$ as shown in FIG. 4 or alternatively an adder 25 may be provided additionally so as to use a signal $(R-Y_L)+(B-Y_L)$ as shown in FIG. 5. Particularly, in the case of the latter the input signal applied to one input of the level discriminator 23 for producing the control signal C becomes $A-(R+B)+2Y_L$ so that the colors at the vertical edge portions are not cancelled in the case of reddish or bluish colors and the colors at the vertical edge portions are suppressed to a greater extent in the case of other colors than the reddish and bluish colors with the large signal $Y_L$. Still further, while, in the above-mentioned embodiment, the subtractor 22 is used to effect the operation of subtraction, an operator 26, such as, a multiplier or divider may be provided as shown in FIG. 6 so as to effect the ratio computation.

Still further, while the embodiment is applied to the color television cameras of the single pick up tube type, and the signal Y or $Y_L$ having the modulated component due to the striped filters removed by the filter 3 or 14 is used as the unmodulated signal for producing the difference signal A, in the case of a two-tube pick up system employing two separate pick up tubes, i.e., a luminance signal pick up tube with no striped filter and a color signal pick up tube with striped filters, the luminance signal from the luminance signal pick up tube, as such, may be used as the unmodulated signal and the rest may be the same as in the case of the single pick up tube type.

From the foregoing it will be seen that in accordance with the invention there is no danger of cancelling all the colors at the vertical edge portions of an object image having a high contrast, but the amount of suppression of the color signals at the vertical edge portions is selectively controlled as desired in dependence on the hues, with the result that there is no danger of the picture quality being deteriorated by any excessive suppression of the color signals, that the occurrence at the vertical edge portions of color errors due to false color signals can be prevented thus producing a natural image and that the circuit construction required for producing these effects can be made relatively simple.

What is claimed is:

1. A method of preventing the occurrence of false color signals generated in a color television camera of the type in which at least two color components of a color image are spatially modulated within a pick up tube by color filter means, and the resulting modulated color signal is demodulated by utilizing a vertical correlation on a reproduced image thereby producing color signals, wherein the improvement comprises the steps of:
  (1) delaying an unmodulated color image luminance indicative signal produced within said camera by one horizontal scanning period;
  (2) combining said unmodulated signal and said delayed unmodulated signal derived by said step (1) to produce a difference signal indicative of the positions of color errors;
  (3) combining said unmodulated signal with at least one of a plurality of demodulated color component signals to produce a color difference signal, adjusting the amplitude of said difference signal by said color difference signal and generating said amplitude adjusted difference signal as a control signal, within said camera; and
  (4) suppressing said color component signals in accordance with said control signal.

2. A method according to claim 1, wherein said step (3) further comprises the step of comparing the level of said amplitude adjusted difference signal with a predetermined reference level whereby said amplitude adjusted difference signal exceeding said reference level is generated as said control signal.

3. A method according to claim 1, wherein said amplitude adjusting of said difference signal by said step (3) is effected by subtracting said color difference signal from said difference signal.

4. A method according to claim 1, wherein said amplitude adjusting of said difference signal by said step (3) is effected by dividing said difference signal by said color difference signal.

5. A method according to claim 1, wherein said color difference signal comprises a signal derived by subtracting said unmodulated color image luminance indicator signal from a red component signal.

6. A method according to claim 1, wherein said color difference signal comprises a signal derived by subtracting said unmodulated color image luminance indicator signal from a blue component signal.

7. A method according to claim 1, wherein said color difference signal comprises a signal derived by adding together a signal derived by subtracting said unmodulated color image luminance indicator signal from a red component signal and a signal derived by subtracting said unmodulated signal from a blue component signal.

8. An apparatus for preventing the occurrence of flase color signals generated in a color television camera of the type in which at least two color components of a color image are spatially modulated within a pick up tube by color filter means and the resulting modulated color signal is demodulated by utilizing a vertical correlation on a reproduced image thereby producing color signals, comprising:
  delay means for delaying an unmodulated color image luminance indicative signal produced within said camera by one horizontal scanning period;
  subtracting means for producing a difference signal indicative of the difference between said unmodulated signal and an output signal from said delay means;
  control signal generating means for combining said unmodulated signal with at least one of a plurality of demodulated color component signals to produce a color difference signal, for adjusting the amplitude of said difference signal by said color difference signal and for outputting said amplitude adjusted difference signal, within said camera; and
  gain control means responsive to the control signal from said control signal generating means to suppress said color signals.

9. An apparatus according to claim 8, wherein said control signal generating means further comprises level discriminating means for comparing the level of said amplitude adjusted difference signal with a predetermined reference level so that said amplitude adjusted difference signal exceeding said reference level is generated as said control signal from said level discriminating means.

10. An apparatus according to claim 8, wherein said control signal generating means comprises a subtractor for subtracting said color difference signal from said difference signal to effect the amplitude adjustment of said difference signal.

11. An apparatus according to claim 8, wherein said control signal generating means comprises computing means for dividing said difference signal by said color difference signal to effect the amplitude adjustment of said difference signal.

12. An apparatus according to claim 8, further comprising circuit means for applying, within said camera, a signal derived by subtracting said unmodulated signal from a demodulated red component signal as said color difference signal to said control signal generating means.

13. An apparatus according to claim 8, further comprising circuit means for applying, within said camera, a signal derived by subtracting said unmodulated signal from a demodulated blue component signal as said color difference signal to said control signal generating means.

14. An apparatus according to claim 8, further comprising an adder for adding together a signal derived by subtracting said unmodulated signal from a demodulated red component signal and a signal derived by subtracting said unmodulated signal from a demodulated blue component signal, within said camera, and means for applying an output of said adder as said color difference signal to said control signal generating means.

* * * * *